J. P. KLINE.
LANTERN BRACKET FOR VEHICLES.
APPLICATION FILED SEPT. 28, 1912.
1,074,272.
Patented Sept. 30, 1913.
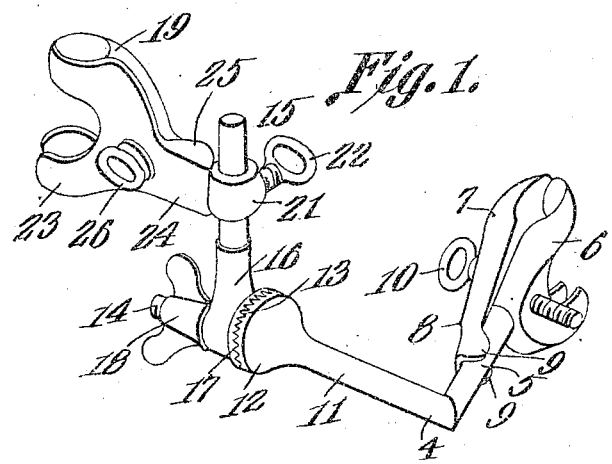
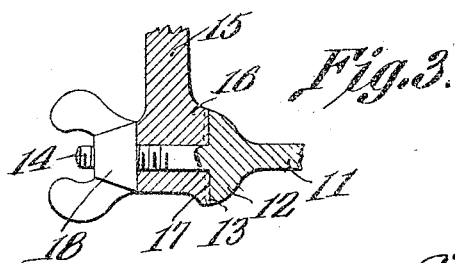
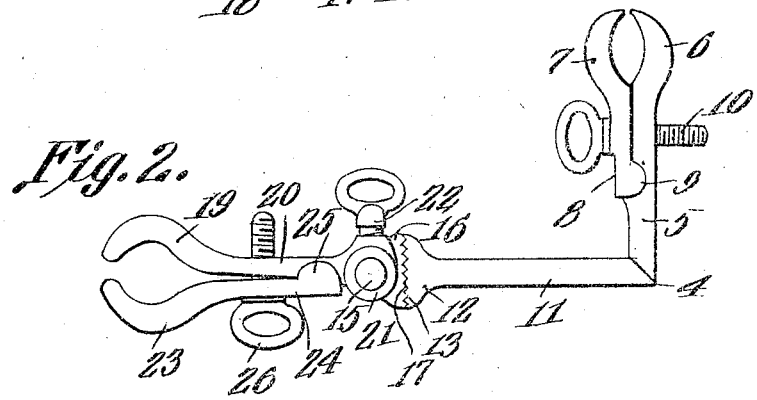
Witnesses
John P. Kline,
Inventor
by
Attorney

UNITED STATES PATENT OFFICE.

JOHN P. KLINE, OF BROOKLYN, MICHIGAN.

LANTERN-BRACKET FOR VEHICLES.

1,074,272.

Specification of Letters Patent. Patented Sept. 30, 1913.

Application filed September 28, 1912. Serial No. 722,878.

*To all whom it may concern:*

Be it known that I, JOHN P. KLINE, a citizen of the United States, residing at Brooklyn, in the county of Jackson and State of Michigan, have invented a new and useful Lantern-Bracket for Vehicles, of which the following is a specification.

The present invention appertains to lantern brackets, and aims to provide a universal lantern bracket adapted to support various lanterns or lamps upon the various parts of a vehicle, such as a buggy, automobile and the like, the bracket being applicable for use in connection with head lights, side lights or tail lights.

It is the object of the present invention to provide a bracket of the character indicated of novel and improved form, which shall be simple, substantial, durable, compact and inexpensive in construction, as well as convenient, serviceable and efficient in use.

With the above and other ends in view, the present invention resides in the novel construction, arrangement and combination of parts hereinafter set forth and claimed, it being understood that changes in the precise embodiment of the invention herein disclosed can be made within the scope of what is claimed without departing from the spirit of the invention.

The preferred embodiment of the invention has been illustrated in the accompanying drawings, wherein—
Figure 1 is a perspective view of the improved bracket. Fig. 2 is a plan view thereof. Fig. 3 is a fragmental detail.

Referring specifically to the drawings, the present bracket embodies an elbow 4, the arm 5 of which is provided at its outer end with a forked jaw 6. A movable forked jaw 7 complements the stationary jaw 6 and the shank 8 thereof is provided with a pair of ears 9 straddling the arm 5 of the elbow, a thumb bolt 10 passing loosely through the jaw 7 and engaging the jaw 6. Thus, a clamp is provided at the end of the arm 5, this clamp being designed to engage any suitable part of a vehicle, such as the side or top of a dashboard, the bow or brace of a top, or the box or body of the carriage, automobile, or other vehicle. The other arm 11 of the elbow is provided at its outer end with a head 12 having its face 13 provided with radial corrugations or notches, a pintle 14 projecting from the head 12.

The post or standard 15 of circular, square or other contour, is provided with a head 16 at its lower end which is journaled or pivoted on the pintle 14 to permit the post to swing about the axis of the arm 11 and pintle 14, the face of the head 16 adjoining the head 12 being provided with radial corrugations or notches 17 complementing the notches 13 of the heads.

A thumb nut 18 is screw threaded onto the pintle 14 in order to clamp the head 16 against the head 12, the corrugations 13 and 17 interengaging so as to constrain the post against swinging under normal conditions.
Thus, it will be seen that the post may be adjusted to any angular position about the arm 11, according to the position of the elbow.

A lantern clamp is adjustably and removably mounted on the post 15, the said clamp embodying a forked jaw 19, the shank 20 of which is provided with an eye or sleeve 21 embracing the post, a set screw 22 being carried by the said eye in order to engage the post for locking the said jaw in any position to which it is set, either angularly about the post or vertically thereon. A forked jaw 23 complements the jaw 19 and the shank 24 thereof is provided with a pair of ears 25 straddling the shank 20 of the jaw 19, a thumb bolt 26 being attached loosely through the movable jaw 23 and engaging the jaw 19 in order to permit the two jaws to be clamped together. This latter clamp is adapted to engage various makes or styles of lanterns, it being preferable to engage the clamp to the lantern by first removing the clamp, and the clamp may then be engaged to the post 15 so as to properly support the lantern therefrom.

From the foregoing, taken in connection with the drawings, it will be evident that the clamp carried by the arm 5 of the elbow may be engaged to any suitable part of a vehicle, and that the post 15 may be properly adjusted, so that when the lantern clamp is engaged to the post, the lantern will be suitably supported. It will also be apparent that the objects aimed at have been carried out in a satisfactory manner, and that the present device has numerous advantages and capabilities, and provides a desirable bracket for the purposes for which it is designed.

Having thus described the invention, what is claimed as new is:

1. A lantern bracket for vehicles embodying an elbow, a clamp carried by one arm thereof to engage the vehicle, a post pivoted to the other arm to swing about the axis of the latter arm, means for clamping the post in any adjusted position, and a lantern clamp rotatably and slidably adjustable on the post.

2. A lantern bracket for vehicles embodying an elbow, a clamp carried by the end of one arm of the elbow to engage the vehicle, the other arm of the elbow having a head at its end, and a pintle projecting from the head, a post having a head at its lower end journaled on the pintle, a member threaded on the pintle to clamp the latter head against the former head, the adjoining faces of the heads being corrugated, and a removable lantern clamp adjustable on the post.

3. A lantern bracket for vehicles, embodying an elbow, one arm thereof having a jaw at its end, a movable jaw complementing the said jaw, the latter jaw having a shank provided with the ears for straddling the said arm, a thumb bolt passing loosely through the latter jaw and engaging the former jaw, a post pivoted to the end of the other arm of the elbow, means for clamping the post to the said arm, and a removable lantern clamp adjustable on the post.

4. A lantern bracket for vehicles, embodying an elbow, a clamp carried by the end of one arm to engage the vehicle, a post pivoted to the end of the other arm of the elbow, means for clamping the post to the said arm, a jaw having a shank provided with an eye embracing the post, a set screw carried by the eye, a movable jaw complementing the said jaw and having its shank provided with ears straddling the aforementioned shank, and a thumb bolt passing loosely through the latter jaw and engaging the former jaw, the jaws being designed for the engagement of various lanterns.

In testimony that I claim the foregoing as my own, I have hereto affixed my signature in the presence of two witnesses.

JOHN P. KLINE.

Witnesses:
H. R. WATKINS,
GEORGE S. COOK.